US012634036B2

(12) United States Patent He et al.

(10) Patent No.: US 12,634,036 B2
(45) Date of Patent: May 19, 2026

(54) METHODS AND APPARATUSES FOR FACILITATING DE-RATE MATCHING OF BITS OF TRANSMITTED SYMBOLS FORMED AFTER A RATE MATCHING PROCEDURE

(71) Applicant: HONG KONG APPLIED SCIENCE AND TECHNOLOGY RESEARCH INSTITUTE, Hong Kong (CN)

(72) Inventors: Siyao He, Shen Zhen (CN); Yat Fai Leung, Hong Kong (CN); Wing Ki Yeung, Hong Kong (CN); Eddy Chiu, Hong Kong (CN); Kong Chau Tsang, Hong Kong (CN)

(73) Assignee: HONG KONG APPLIED SCIENCE AND TECHNOLOGY RESEARCH INSTITUTE, Hong Kong (CN)

( * ) Notice: Subject to any disclaimer, the term of this patent is extended or adjusted under 35 U.S.C. 154(b) by 440 days.

(21) Appl. No.: 18/299,930

(22) Filed: Apr. 13, 2023

(65) Prior Publication Data

US 2024/0348364 A1 Oct. 17, 2024

(51) Int. Cl.
*H04L 1/00* (2006.01)
*G06F 12/0802* (2016.01)

(52) U.S. Cl.
CPC ........ *H04L 1/0045* (2013.01); *G06F 12/0802* (2013.01); *H04L 1/0067* (2013.01); *G06F 2212/174* (2013.01)

(58) Field of Classification Search
CPC ... H04L 1/0045; H04L 1/0067; H04L 1/1835; G06F 12/0802; G06F 2212/174
See application file for complete search history.

(56) References Cited

U.S. PATENT DOCUMENTS

| | | | |
|---|---|---|---|
| 10,103,843 B1 * | 10/2018 | Liu | H04L 1/0071 |
| 11,418,294 B2 | 8/2022 | Liu et al. | |
| 2010/0235721 A1 * | 9/2010 | Bukris | H03M 13/635 714/E11.031 |
| 2011/0145670 A1 * | 6/2011 | Fan | H03M 13/2957 714/E11.131 |

(Continued)

FOREIGN PATENT DOCUMENTS

| | | |
|---|---|---|
| CN | 111630781 A | 9/2020 |
| CN | 112737731 A | 4/2021 |

(Continued)

OTHER PUBLICATIONS

International Search Report and Written Opinion for Application No. PCT/CN2023/089373, dated Dec. 22, 2023 (8 pages).

*Primary Examiner* — Shah M Rahman
(74) *Attorney, Agent, or Firm* — MICHAEL BEST & FRIEDRICH LLP

(57) ABSTRACT

The present disclosure proposes a method used by a receiver for facilitating de-rate matching of bits of symbols formed after a rate matching procedure from a transmitter, wherein the transmitter selected Z bits from channel-coded bits, and then generated E bits by concatenation of the Z bits and their copies for the rate matching procedure. The method facilitates the de-rate matching by directly adding E soft bits from the demodulation in a particular manner to generate the Z soft bits, thus reducing memory usage and processing latency required by the de-rate matching.

14 Claims, 7 Drawing Sheets

(56)     References Cited

U.S. PATENT DOCUMENTS

| | | | |
|---|---|---|---|
| 2013/0028335 A1* | 1/2013 | Limberg ................. | H04L 1/005 |
| | | | 375/240.27 |
| 2013/0047051 A1 | 2/2013 | Niewczas et al. | |
| 2013/0176981 A1* | 7/2013 | Earnshaw ............. | H04L 1/1835 |
| | | | 370/329 |
| 2016/0218830 A1* | 7/2016 | Martinez ............... | H04L 1/1841 |
| 2016/0381673 A1 | 12/2016 | Sun et al. | |
| 2018/0007664 A1 | 1/2018 | Gho et al. | |
| 2018/0035411 A1* | 2/2018 | Wang .................... | H04W 72/23 |
| 2018/0234114 A1 | 8/2018 | Soriaga et al. | |
| 2019/0305887 A1* | 10/2019 | Jang ..................... | H04L 1/0061 |
| 2020/0099400 A1* | 3/2020 | Robert Safavi ..... | H03M 13/271 |
| 2020/0404622 A1* | 12/2020 | Fliess ................... | H04L 1/0059 |
| 2021/0119848 A1 | 4/2021 | Ibars et al. | |
| 2021/0320675 A1* | 10/2021 | Liu ...................... | H03M 13/13 |
| 2021/0385015 A1* | 12/2021 | Ma ...................... | H03M 13/635 |
| 2023/0031031 A1* | 2/2023 | Dai ..................... | H03M 13/116 |

FOREIGN PATENT DOCUMENTS

| | | | | |
|---|---|---|---|---|
| CN | 112929127 A | 6/2021 | | |
| CN | 113328828 A | 8/2021 | | |
| CN | 113472476 A | 10/2021 | | |
| CN | 111106837 B | * 9/2023 | ........ | H03M 13/1108 |
| WO | 2015010732 A1 | 1/2015 | | |

* cited by examiner a transport block of dynamic size
delivered from the MAC layer Write                    Read

• Step-by-step operations for de-interleaving

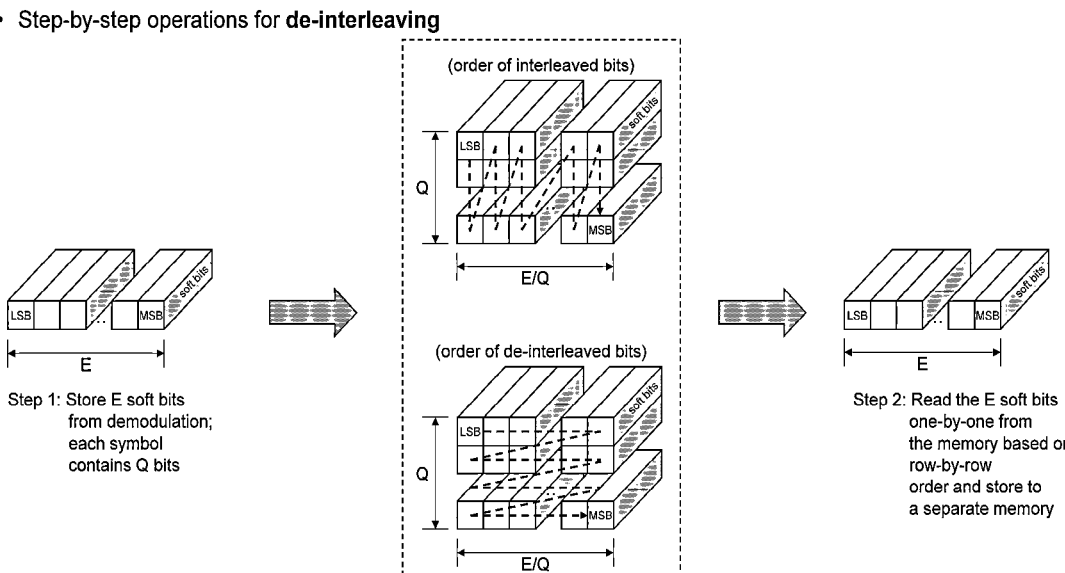

Step 1: Store E soft bits
from demodulation;
each symbol
contains Q bits

Step 2: Read the E soft bits
one-by-one from
the memory based on
row-by-row
order and store to
a separate memory LSB: Least Significant Bit    MSB: Most Significant Bit

Figure 6

• Step-by-step operations of de-bit selection

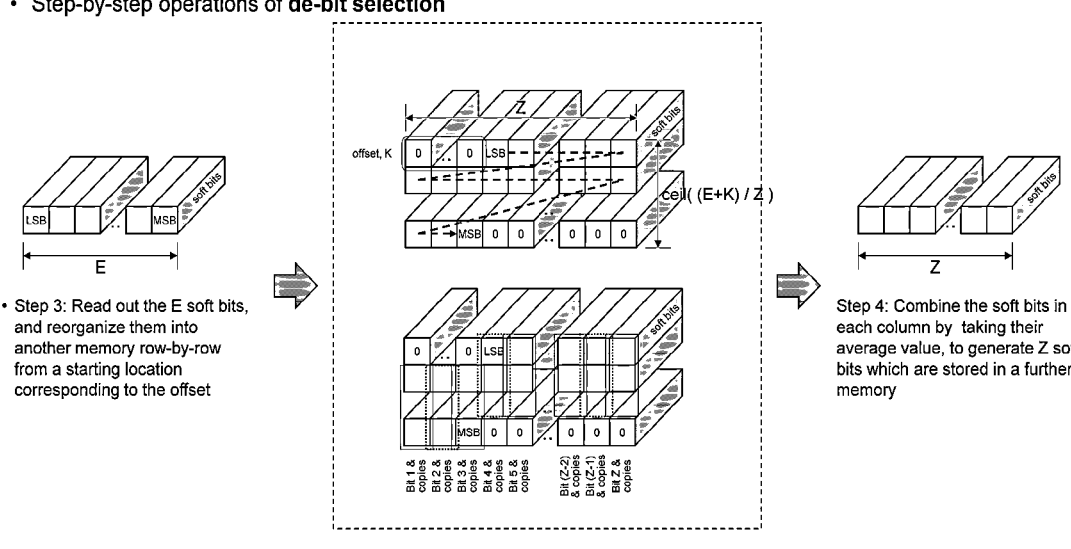

• Step 3: Read out the E soft bits,
and reorganize them into
another memory row-by-row
from a starting location
corresponding to the offset Step 4: Combine the soft bits in
each column by taking their
average value, to generate Z soft
bits which are stored in a further
memory

801 demodulating the symbols to obtain E soft bits corresponding to the E bits 802 zeroing values at Z consecutive locations of a memory, wherein the Z consecutive locations correspond to bit positions of the Z bits 803 writing the E soft bits into a buffer device 804 for each soft bit of the E soft bits in the buffer device, directly adding value of the soft bit and value from a location of the Z consecutive locations and storing result of the addition back into the location, wherein a bit in the E bits corresponding to the soft bit is a bit in the Z bits corresponding to the location or a copy of the bit in the Z bits 805 restoring the Z bits from the final results at the Z consecutive locations

Figure 8

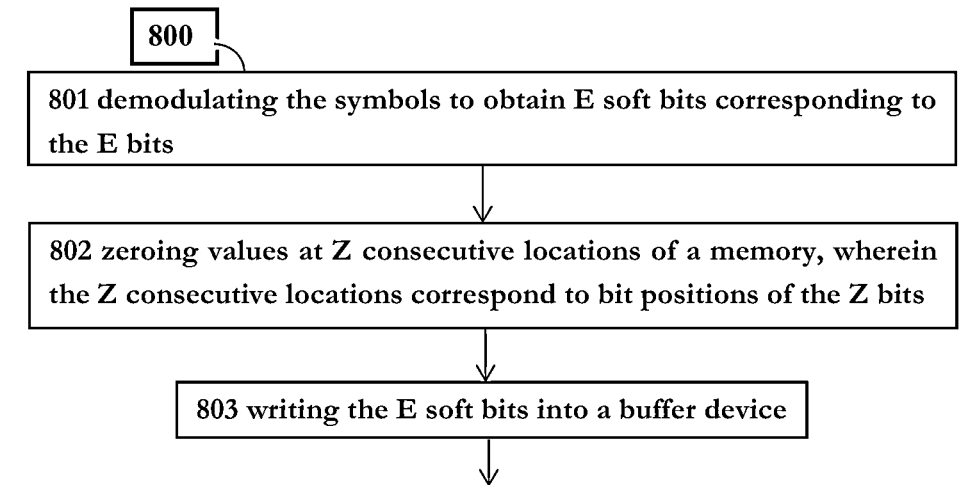

sequence of interleaved soft bits     sequence of de-interleaved soft bits

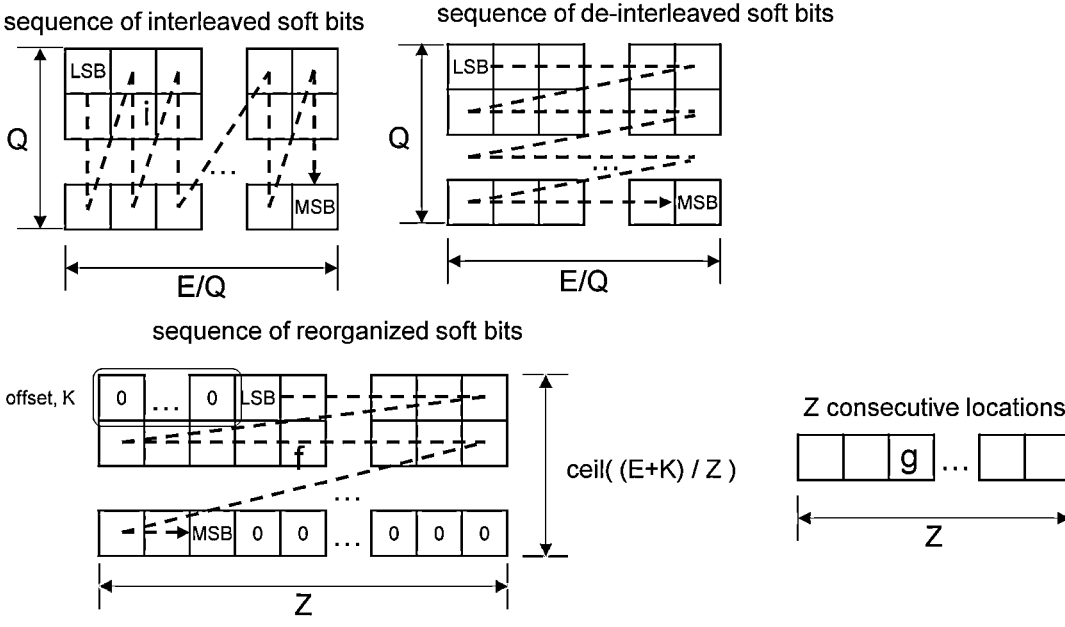

sequence of reorganized soft bits

METHODS AND APPARATUSES FOR FACILITATING DE-RATE MATCHING OF BITS OF TRANSMITTED SYMBOLS FORMED AFTER A RATE MATCHING PROCEDURE

TECHNICAL FIELD

The non-limiting and example embodiments of the present disclosure generally relate to the technical field of mobile communication network, and specifically to methods and apparatuses for facilitating de-rate matching of bits of transmitted symbols formed after a rate matching procedure in mobile communication network.

BACKGROUND

This section introduces aspects that may facilitate a better understanding of the disclosure. Accordingly, the statements of this section are to be read in this light and are not to be understood as admissions about what is in the prior art or what is not in the prior art.

In a mobile communication network of today, a rate matching procedure is often used to match the coded bits with the resources assigned for transmission. The rate matching procedure may occur in processing of the physical layer of a mobile communication network. As an example, a typical processing flow of the physical layer of 5th Generation (5G) mobile communication network is shown in FIG. 1. The processing flow follows a similar structure as for 4th Generation (4G) mobile communication network.

As can be seen from FIG. 1, a transport block of dynamic size is delivered from the MAC layer to the physical layer within each transmission time interval (TTI). A Cyclic Redundancy Check (CRC) for error-detecting purposes is added to each transport block, followed by error-correcting coding using Low Density Parity Check (LDPC) codes. Rate matching, including physical layer hybrid-ARQ (ARQ stands for Automatic Repeat reQuest) functionality, adapts the number of coded bits to the scheduled resources. The bits are scrambled and fed to a modulator, and finally the modulation symbols are mapped to the physical resources, including the spatial domain.

The LDPC coder in 5G network is defined up to a certain code block size (which may be 8424 bits for base graph 1 and 3840 bits for base graph 2). To handle transport block sizes larger than this, code block segmentation is used where the transport block, including the CRC, is split into multiple equal-sized code blocks as illustrated in FIG. 2.

As can be seen in FIG. 2, code block segmentation also implies that an additional CRC (different from the transport-block CRC described above) is calculated for and appended to each code block. In the case of a single code block transmission no additional code block CRC is applied.

For each code block, the rate matching is performed separately. First, a part of or all of the coded bits from the channel coding will be written into a circular buffer. For example, a number of the systematic bits from the channel coding may be punctured. The fraction of systematic bits punctured can be relatively high, up to ⅓ of the systematic bits, depending on the code block size. The remaining coded bits are written into the circular buffer, starting with the non-punctured systematic bits and continuing with parity bits as illustrated in FIG. 3. The selection of the bits to transmit is based on reading the required number of bits from the circular buffer where the exact set of bits to transmit depends on the redundancy version (RV) corresponding to different starting positions (or different offsets) in the circular buffer. Hence, by selecting different redundancy versions, different sets of coded bits representing the same set of information bits can be generated, which is used when implementing hybrid-ARQ with incremental redundancy. The starting points in the circular buffer are defined such that both RV0 and RV3 are self-decodable, that is, includes the systematic bits under typical scenarios. This is also the reason RV3 is located after "nine o'clock" in FIG. 3 as this allows more of the systematic bits to be included in the transmission. It is to be noted that, although the bit selection is performed with offsets corresponding to the RVs in the 5G network, the bit selection may be performed with other kinds of offsets or without offsets at all in other mobile communication networks.

The rate matching procedure may also include a step to interleave the bits using a block interleaver and to collect the bits from each code block. An example of interleaving the bits is shown in FIG. 4, where the bits generated by the bit selection are written row-by-row into a block interleaver and read out column-by-column. The number of rows in the interleaver is given by the modulation order and hence the bits in one column correspond to one modulation symbol. This results in the systematic bits spread across the modulation symbols, which improves performance of the communication.

The rate-matching and physical-layer hybrid-ARQ functionality serves two purposes, namely to extract a suitable number of coded bits to match the resources assigned for transmission and to generate different redundancy versions needed for the hybrid-ARQ protocol. For example, the number of bits to transmit on the PDSCH or PUSCH depends on a wide range of factors, not only the number of resource blocks and the number of OFDM symbols scheduled, but also on the amount of overlapping resource elements used for other purposes and such as reference signals, control channels, or system information. There is also a possibility to, in the downlink, define reserved resources as a tool to provide future compatibility, which affects the number of resource elements usable for the PDSCH.

In the receiver, soft combining is an important part of the hybrid-ARQ functionality. The soft values representing the received coded bits are buffered and, if a retransmission occurs, decoding is performed using the buffered bits combined with the retransmitted coded bits. In addition to a gain in accumulated received Eb/N0, with different coded bits in different transmission attempts, additional parity bits are obtained and the resulting code rate after soft combining is lower with a corresponding coding gain obtained.

FIG. 5 illustrates a block diagram generally reflecting an example of the processing of the physical layer. As seen from the right half part of FIG. 5, a transmitter generates a code block with X bits. Then, the transmitter puts Y coded bits obtained after the channel encoding into the circular buffer whose length is just Y bits. It is to be noted that, Y coded bits may be a part of all coded bits obtained after the channel encoding, as described above, and may include some filler bits from code block segmentation. Next, E bits will be selected from the Y bits in the circular buffer, e.g., starting from a position corresponding to the offset, and skipping the filler bits. Because the selected E bits may be more than Y bits to match the resources assigned for transmission and the selection is performed on the circular buffer, the selection of the E bits may be seen as selecting Z bits (starting from the position corresponding to the offset) which may be all bits other than the filler bits in the Y bits, and then concatenating the Z bits and their copies to generate E bits (It is to be noted that, the number of the copies is not necessarily an integral multiple of Z). The E bits will be interleaved and modulated (not shown in the right half part of FIG. 5) to generate modulation symbols before being transmitted to a receiver. After obtaining E soft bits representing the E bits as a result of demodulation of the received modulation symbols, the receiver performs de-rate matching, including de-interleaving and de-bit selection, on the E soft bits to restore the Z bits. Then, the receiver may use the Z bits to restore the Y bits, and decode the Y bits to restore the X bits of that code block.

Step-by-step operations for the de-interleaving in the prior art are shown in FIG. 6. As shown in FIG. 6, in step 1, the receiver stores E soft bits from the demodulation column-by-column into a first memory, wherein the number of rows in the first memory for storing the soft bits is Q, which is the number of bits formed a modulation symbol. In step 2, the receiver reads the E soft bits row-by-row from the first memory into a second memory for de-bit selection.

Step-by-step operations for the de-bit selection in the prior art are shown in FIG. 7. As shown in FIG. 7, in step 3, the receiver reads out the E soft bits from the second memory, and reorganizes the E soft bits into a third memory row-by-row from a starting location corresponding to the offset used for selecting the Z bits in the transmitter, wherein the number of columns for the reorganization is Z, and thus the number of rows for the reorganization is $ceil((E+K)/Z)$, where $ceil(X)$ is function to map the real number X to the least integer greater than or equal to X. With the reorganization, the first soft bit in a column corresponds to a bit in the Z bits, and each of the other soft bits in the same column corresponds to a copy of that bit in the Z bits. In addition, the receiver will fill zero(s) before and after the reorganized E soft bits, as illustrated in FIG. 7. In step 4, the receiver combines the soft bits in each of the columns from the third memory by taking their average value, to generate Z soft bits which are stored in a fourth memory and may be used to restore the Z bits.

SUMMARY

However, the inventors of the present disclosure find, the above step-by-step operations for the de-rate matching in the prior art require high memory usage and high processing latency, which may reduce the resource utilization efficiency and the communication rate and thus reduce user experience. In particular, the required memory and latency for each of the above steps 1-4 are shown in Table 1 below, thus for all of the 4 steps, the required total memory is $(E+E+Z \times ceil((E+K)/Z)+Z) \times L$ bytes (assuming L is the number of bytes occupied by each of the E soft bits), and the required total latency is T1+T2+T3+T4.

TABLE 1

| Memory amount and latency required for each of the steps 1-4 | |
| --- | --- |
| Required Memory Amount | Required Latency |
| step 1  E × L bytes | T1 required for writing the E soft bits (to a first memory) |
| step 2  E × L bytes | T2 required for reading the E soft bits (from the first memory) and writing them (into a second memory) |
| step 3  (Z × ceil((E + K)/ Z)) × L bytes | T3 required for reading the E soft bits (from the second memory) and writing them (into a third memory) |

TABLE 1-continued

| Memory amount and latency required for each of the steps 1-4 | |
| --- | --- |
| Required Memory Amount | Required Latency |
| step 4  Z × L bytes | T4 required for reading the E soft bits (from the third memory) and performing Z × (ceil((E + K)/Z) − 1) soft bit additions and Z times of soft bit averaging to generate Z soft bits and writing the Z soft bits (into a fourth memory) |

To resolve or alleviate the above problem, which is one of the objects of the present disclosure, the inventors of the present disclosure conceive of a solution, which facilitates the de-rate matching by directly adding E soft bits from the demodulation in a particular manner to generate the Z soft bits, without performing the above step 2 and step 3, thus reducing memory usage and processing latency required by the de-rate matching. The solution may further expedite the de-rate matching by introducing a pipeline processing.

According to a first aspect of the present disclosure, the object is achieved by a method used by a receiver for facilitating de-rate matching of bits of symbols formed after a rate matching procedure from a transmitter, wherein the transmitter selected Z bits from channel-coded bits, and then generated E bits by concatenation of the Z bits and their copies for the rate matching procedure, and every Q bits formed a symbol. The method comprises: demodulating the symbols to obtain E soft bits corresponding to the E bits; zeroing values at Z consecutive locations of a memory, wherein the Z consecutive locations correspond to bit positions of the Z bits; writing the E soft bits into a buffer device; for each soft bit of the E soft bits in the buffer device, directly adding value of the soft bit and value from a location of the Z consecutive locations and storing result of the addition back into the location, wherein a bit in the E bits corresponding to the soft bit is a bit in the Z bits corresponding to the location or a copy of the bit in the Z bits; and restoring the Z bits from the final results at the Z consecutive locations.

According to a second aspect of the present disclosure, the object is achieved by a receiver for facilitating de-rate matching of bits of symbols formed after a rate matching procedure from a transmitter, wherein the transmitter selected Z bits from channel-coded bits, and then generated E bits by concatenation of the Z bits and their copies for the rate matching procedure, and every Q bits formed a symbol. The receiver comprises: a demodulator, for demodulating the symbols to obtain E soft bits corresponding to the E bits; a memory, having Z consecutive locations corresponding to bit positions of the Z bits, wherein values at the Z consecutive locations are zeroed before the following additions; a buffer device, for writing the E soft bits; an adder, for each soft bit of the E soft bits in the buffer device, for directly adding value of the soft bit and value from a location of the Z consecutive locations and storing result of the addition back into the location, wherein a bit in the E bits corresponding to the soft bit is a bit in the Z bits corresponding to the location or a copy of the bit in the Z bits; and a restorer, for restoring the Z bits from the final results at the Z consecutive locations.

According to a third aspect of the present disclosure, the object is achieved by a receiver, comprising: a processor; and a memory, having stored instructions that when executed by the processor cause the receiver to perform the method according to the first aspect.

According to a fourth aspect of the present disclosure, the object is achieved by a machine readable medium, having stored thereon instructions, that when executed on a receiver, cause the receiver to perform the method according to the first aspect.

The solution of the present disclosure facilitates the de-rate matching by reducing its memory usage and processing latency, which in turn improves the resource utilization efficiency and the communication rate and thus the user experience.

BRIEF DESCRIPTION OF THE DRAWINGS

The above and other aspects, features, and benefits of the present disclosure will become more fully apparent from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 6 illustrates step-by-step operations for the de-interleaving in the prior art;

FIG. 7 illustrates step-by-step operations for the de-bit selection in the prior art;

FIG. 8 illustrates a flowchart of a method used by a receiver according to the present disclosure;

FIG. 9 shows a relation between the index of the location in the Z consecutive locations and the index of the soft bit in the sequence of the E soft bits according to the present disclosure;

DETAILED DESCRIPTION

Figure 1:
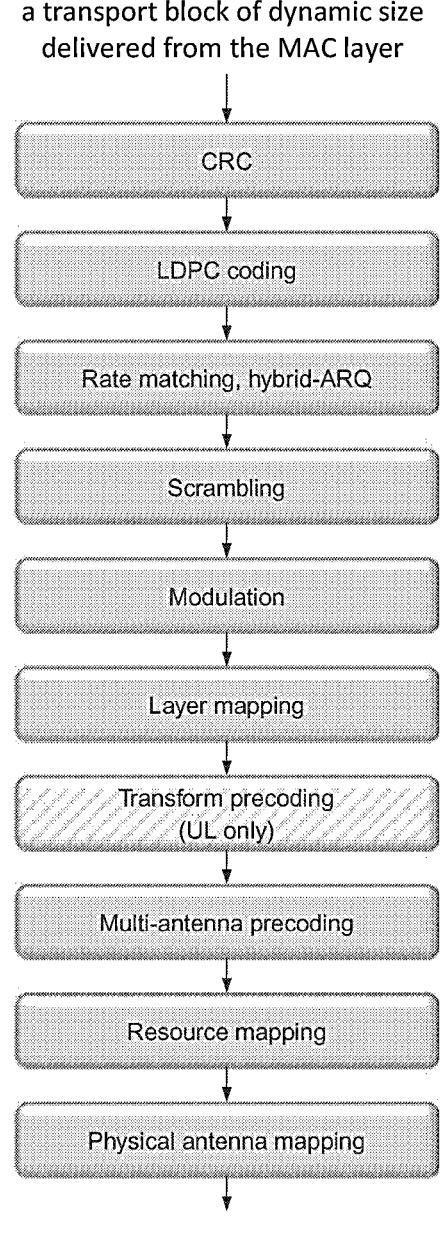
FIG. 1 shows a typical processing flow of the physical layer of 5G mobile communication network.
Figure 2:
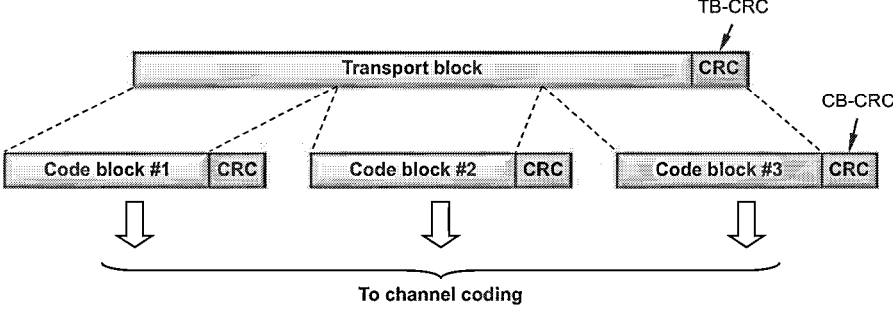
FIG. 2 illustrates a schematic diagram of code block segmentation and code block CRC attachment.
Figure 3:
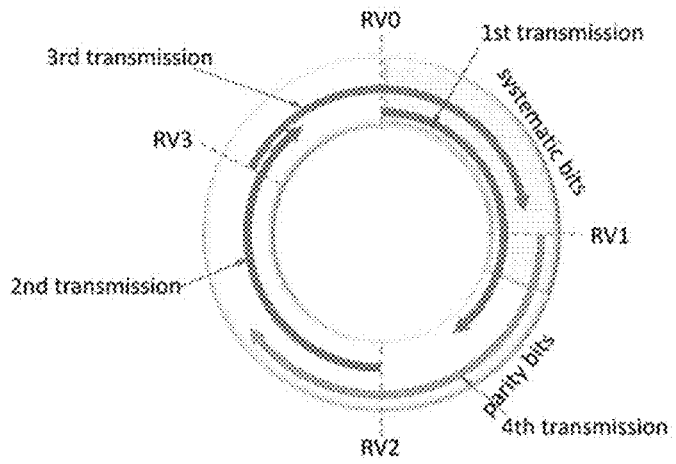
FIG. 3 illustrates a schematic diagram of an exemplary circular buffer for incremental redundancy.
Figure 4:
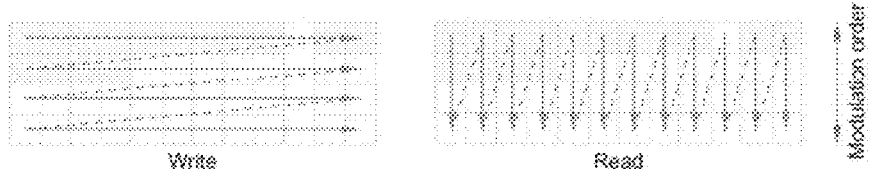
FIG. 4 illustrates an example of interleaving the bits.
Figure 5:
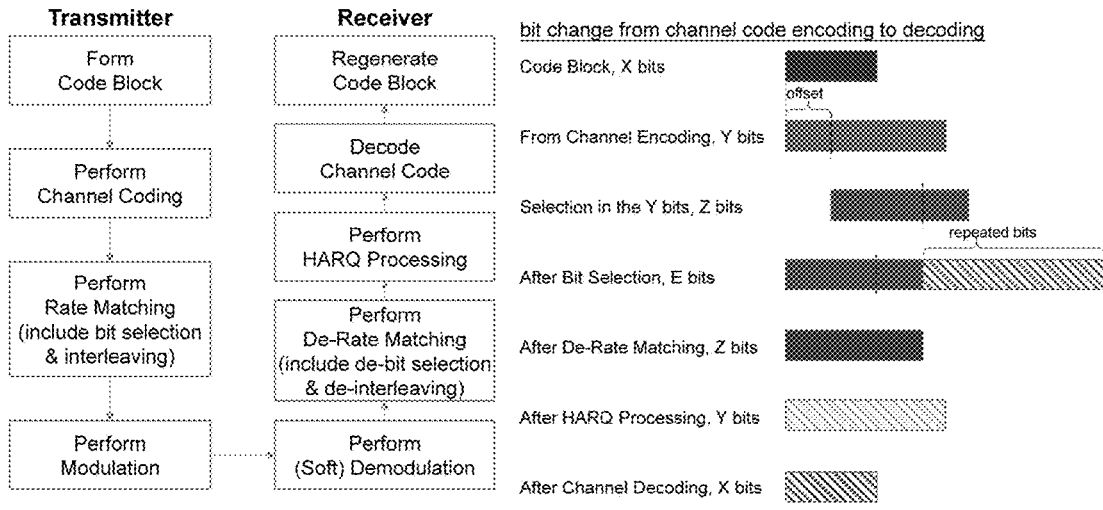
FIG. 5 illustrates a block diagram generally reflecting an example of the processing of the physical layer.

Embodiments herein will be described more fully hereinafter with reference to the accompanying drawings. The embodiments herein may, however, be embodied in many different forms and should not be construed as limiting the scope of the appended claims.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising,"

"includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., herein to modify an element does not by itself connote any priority, precedence, or order of one element over another or the temporal order in which acts of a method are performed, but are used merely as labels to distinguish one element having a certain name from another element having a same name (but for use of the ordinal term) to distinguish the elements. Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

A flowchart of a method 800 used by a receiver for facilitating de-rate matching of bits of symbols formed after a rate matching procedure from a transmitter is shown in FIG. 8, wherein the transmitter selected Z bits from channel-coded bits, and then generated E bits by concatenation of the Z bits and their copies for the rate matching procedure, and every Q bits formed a symbol. The method 800 comprises: a step 801 of demodulating the symbols to obtain E soft bits corresponding to the E bits; a step 802 of zeroing values at Z consecutive locations of a memory, wherein the Z consecutive locations correspond to bit positions of the Z bits; a step 803 of writing the E soft bits into a buffer device; a step 804 of, for each soft bit of the E soft bits in the buffer device, directly adding value of the soft bit and value from a location of the Z consecutive locations and storing result of the addition back into the location, wherein a bit in the E bits corresponding to the soft bit is a bit in the Z bits corresponding to the location or a copy of the bit in the Z bits; and a step 805 restoring the Z bits from the final results at the Z consecutive locations.

Now, further embodiments of the method will be described in connection with a receiver in a 5G network. It can be understood that, although the embodiments herein are described in the context of the 5G network, the embodiments can be also applied to receivers in other mobile communication networks, if the same problem exists in their de-rate matching mechanism. It will be also understood that, although specific terms are used in the embodiments, those specific terms may refer to different entities in different situations. For example, in a downlink, the term "transmitter" may refer to e.g., access point, base station, macro base station, femto base stations, NodeB (NB), eNodeB (eNB), gNodeB (gNB) or the like, and the "receiver" may refer to e.g., User Equipment (UE), user terminal, station, terminal, terminal node or the like; while in a uplink, the term "transmitter" herein may refer to e.g., User Equipment (UE), user terminal, station, terminal, terminal node or the like, and the "receiver" herein may refer to e.g., access point, base station, macro base station, femto base stations, NodeB (NB), eNodeB (eNB), gNodeB (gNB) or the like.

As described above with respect to FIG. 6 and FIG. 7, in the de-rate matching of the prior art, the receiver stores E soft bits in a memory after de-interleaving of the E soft bits from the demodulation, reads out them from the memory, reorganizes them into another memory row-by-row from a starting location corresponding to the offset used for selecting the Z bits in the transmitter (so that the first soft bit in a column corresponds to a bit in the Z bits, and each of the other soft bits in the same column corresponds to a copy of that bit in the Z bits), and combines the soft bits in each of the columns by taking their average value, to generate Z soft bits.

On the contrary, in the method of the present disclosure, the de-rate matching is facilitated by directly adding the E soft bits from the demodulation in a particular manner to generate the Z soft bits, without needing to performing the de-interleaving and reorganization. In particular, if a transmitter selected Z bits from channel-coded bits, and then generated E bits by concatenation of the Z bits and their copies for a rate matching procedure, the operations for facilitating de-rate matching of bits of symbols formed after the rate matching procedure from the transmitter by a receiver according to the present disclosure include: demodulating the symbols to obtain E soft bits corresponding to the E bits; zeroing values at Z consecutive locations of a memory, wherein the Z consecutive locations correspond to bit positions of the Z bits; writing the E soft bits into a buffer device; for each soft bit of the E soft bits in the buffer device, directly adding value of the soft bit and value from a location of the Z consecutive locations and storing result of the addition back into the location, under a condition that a bit in the E bits corresponding to the soft bit is a bit in the Z bits corresponding to the location or a copy of the bit in the Z bits. The direct additions according to the present disclosure will ensure, for each bit of the Z bits, only soft bits corresponding to it or its copies will be added together, thus the de-interleaving and reorganization are no longer needed to be performed separately.

In an embodiment, if it is assumed that i represents the index of a soft bit in the sequence of the E soft bits, and K represents the offset used when selecting the Z bits in the rate matching procedure, then said condition may be guaranteed by a relation between the index of the location in the Z consecutive locations and the index of the soft bit in the sequence of the E soft bits, i.e., the index of the location relating to the addition for the soft bit in the Z consecutive locations is $f-\text{floor}(f/Z) \times Z$, where $f=K+(i-\text{floor}(i/Q) \times Q) \times (E/Q)+\text{floor}(i/Q)$, wherein floor(X) is a function which maps the real number X to the greatest integer less than or equal to X.

The above relation between the two indexes may be understood better with reference to FIG. 9. As shown in FIG. 9, when the sequence of the E soft bits (labelled as "sequence of interleaved soft bits" in FIG. 9) is arranged column-by-column as a matrix with Q rows and E/Q columns, for a soft bit with index i in the sequence of the interleaved soft bits, there will be total $(i-\text{floor}(i/Q) \times Q) \times (E/Q)$ soft bits on the top of that soft bit in the matrix, and there will be floor(i/Q) soft bits on the left of that soft bit on the same row. On the other hand, the E soft bits in the matrix may also be seen as another sequence formed if being de-interleaved (labelled as "sequence of de-interleaved soft bits" in FIG. 9) when the E soft bits follows row-by-row order, according to the principle of the de-interleaving. Hence, in the sequence of de-interleaved soft bits, that soft bit should have an index $(i-\text{floor}(i/Q) \times Q) \times (E/Q)+\text{floor}(i/Q)$. It is to be noted that, although the "sequence of de-interleaved soft bits" is shown in FIG. 9 for illustration, the method of the present disclosure does not perform the de-interleaving separately. Further, in the sequence including the E soft bits and the filled zero(s) formed if the E soft bits are reorganized (labelled as "sequence of reorganized soft bits" in FIG. 9), the index (labelled as "f" in FIG. 9) of that soft bit should be: $K+(i-\text{floor}(i/Q) \times Q) \times (E/Q)+\text{floor}(i/$ Q). It is to be noted that, although the "sequence of reorganized soft bits" is shown in FIG. 9 for illustration, the method of the present disclosure does not perform the reorganization separately. Finally, since the index of the column including the soft bit with index f in the sequence of reorganized soft bits is $f-\text{floor}(f/Z) \times Z$, the index of the location relating to the addition for the soft bit in the Z consecutive locations is also $f-\text{floor}(f/Z) \times Z$.

The method of the present disclosure may further expedite the de-rate matching by incorporating a pipeline processing into the de-rate matching. For example, in an embodiment, the E soft bits is divided into multiple portions, the buffer device includes two buffers, and the method according to the present disclosure performs a pipeline processing for the writing and the additions by the following operations: alternately writing (i.e., storing) a different portion of the multiple portions into one of the two buffers in a writing order, and if the portion is not the first portion of the multiple portions, then simultaneously reading soft bits of a previous portion before the portion from the other buffer of the two buffers in a reading order to perform the additions for the soft bits of the previous portion; and reading soft bits of the last portion of the multiple portions in the reading order from a buffer in the two buffers which stores the last potion to perform the additions for the soft bits of the last portion. It is to be noted that, in this embodiment, the writing order and the reading order can be any order convenient for processing, since the method according to the present disclosure cares about the abovementioned condition regarding the soft bits and the Z consecutive locations, rather than the two orders.

Figure 10:
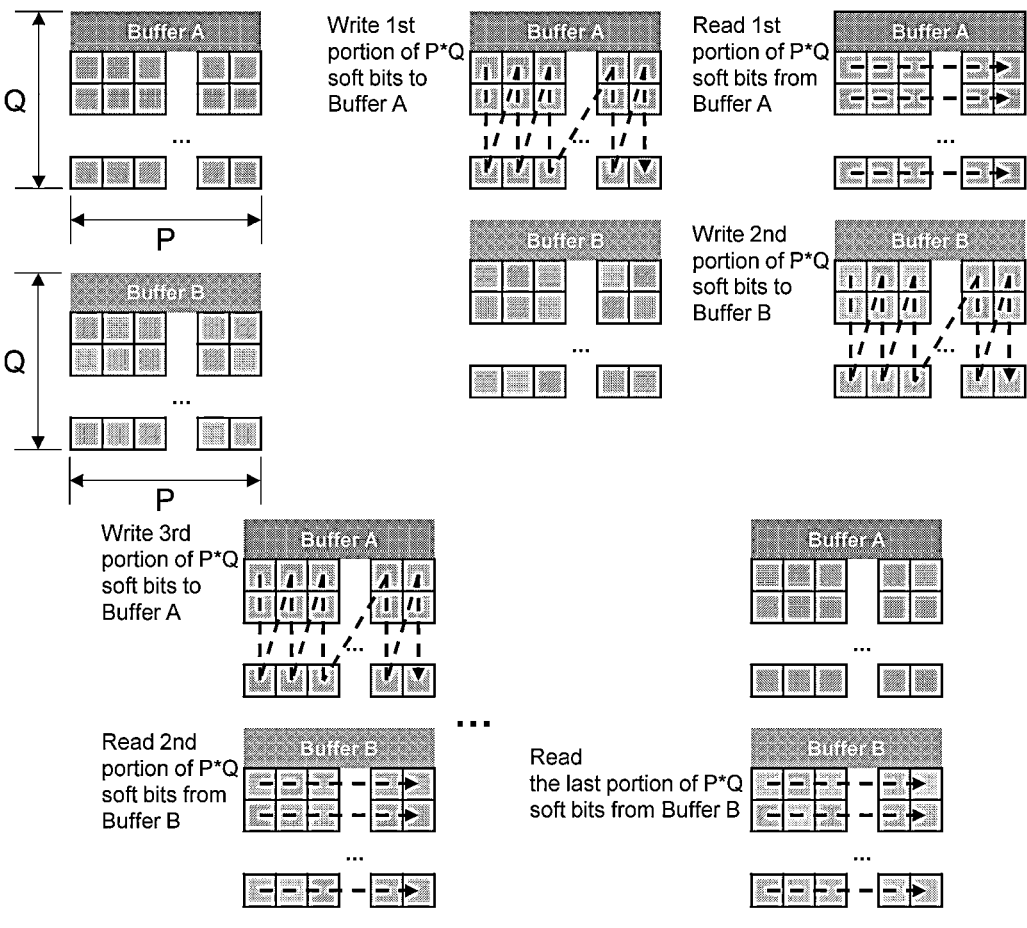
FIG. 10 shows an example of the pipeline processing according to the present disclosure.

An example of the pipeline processing is shown in FIG. 10. As illustrated in the figure, the E soft bits is divided into multiple portions each having P×Q soft bits which will be regarded as a Q-row P-column matrix, the buffer device includes Buffer A and Buffer B, and the pipeline processing for the writing and the additions includes: alternately writing (i.e., storing) a different portion of the multiple portions into one of Buffers A and B as Q-row P-column soft bits in column-by-column order, and if the portion is not the first portion of the multiple portions (the first portion is written into Buffer A in the example of FIG. 10), then simultaneously reading Q-row P-column soft bits of a previous portion before the portion from the other buffer of Buffers A and B in row-by-row order to perform the additions for the soft bits of the previous portion; reading Q-row P-column soft bits of the last portion of the multiple portions in row-by-row order from a buffer storing the last portion in Buffers A and B (Buffer B stores the last portion in the example of FIG. 10) to perform the additions for the soft bits of the last portion.

To improve efficiency and considering that some memory chips can only be read and written in blocks, processing direct additions involving multiple soft bits (including performance of the direct additions and storage of their results) according to the present disclosure may be performed at a time. For example, in a further embodiment of the above example, width W (bytes) of the memory containing the Z consecutive locations is set to be an integral multiple of P×L bytes (wherein L is the number of bytes occupied by each of the E soft bits, as described above), which is convenient for processing direct additions involving a row of P soft bits read from Buffer A or Buffer B at a time in some case. However, it is to be noted that, W and P can be any arbitrary number suitable for processing.

Figure 11:
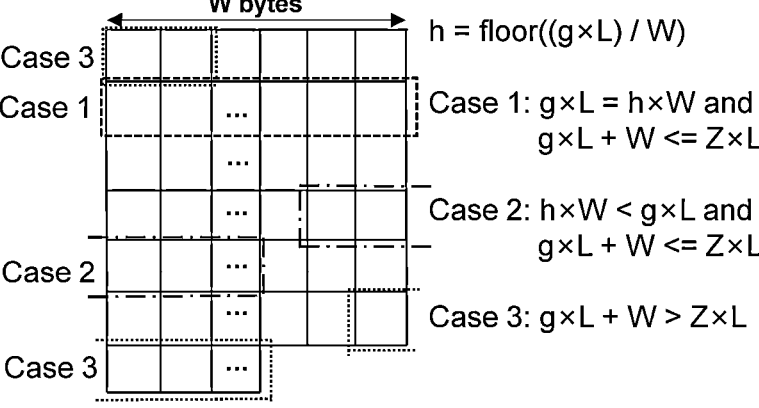
FIG. 11 shows three cases of accessing the memory containing the Z consecutive locations in an embodiment according to the present disclosure.

In the above further embodiment, there are three cases of accessing the memory containing the Z consecutive locations, as shown in FIG. 11, if direct additions involving P soft bits are processed at a time. From FIG. 11, it can be seen that the Z consecutive locations is regarded as a part of a matrix with the width W (bytes) of the memory (W=P×L, as described above), although a few locations after the Z consecutive locations at the end of the matrix may be invalid (since Z×L is not necessarily an integral multiple of W). If the index of the first soft bit of the P soft bits is g, then the number of rows on the top of the first soft bit in the matrix is h=floor((g×L)/W), and thus for processing the direct additions at a time, (1) just one row in the matrix needs to be accessed in the case where g×L=h×W and g×L+W<=Z×L (labelled as "Case 1" in FIG. 11), (2) two consecutive rows in the matrix need to be accessed in the case where h×W<g×L and g×L+W<=Z×L (labelled as "Case 2" in FIG. 11), (3) the last two rows and the first row in the matrix need to be accessed in the case where g×L+W>Z×L (labelled as "Case 3" in FIG. 11).

Figure 12:
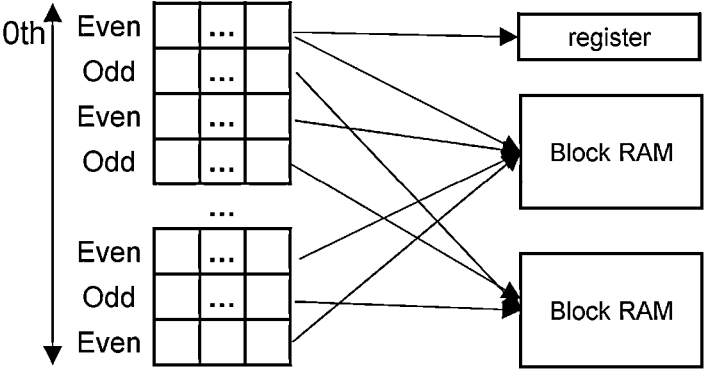
FIG. 12 shows an exemplary implementation of the memory according to the present disclosure.

In view of the above three cases, in an exemplary implementation of the memory for the above further embodiment, the memory is implemented by using two block RAMs and one register, wherein one RAM acts as a storage area composed of all even rows of the memory, the other RAM acts as a storage area composed of all odd rows of the memory, and the register acts as a storage area composed of the first row of the memory, as shown in FIG. 12. For a block RAM implementing part of the memory, a row of the above matrix in the block RAM has a corresponding address, and an access with respect to that address may lead to an access of that whole row. Therefore, in this implementation, it is possible to access with respect to two consecutive addresses from the two block RAMs to access two consecutive rows in the matrix at the same time for the second case ("Case 2" in FIG. 11), and access with respect to the last two addresses from the two block RAMs to access the last two rows in the matrix and access the first row in the matrix from the register at the same time for the third case ("Case 3" in FIG. 11), thus improving the speed of the processing.

After all direct additions for the E soft bits are processed, the Z bits may be restored from the final results at the Z consecutive locations. Since a soft bit is a value representing the probability that the corresponding bit is 1 or 0, a sum formed by adding values of the soft bits corresponding to a bit or copies of the bit may also be seen as a value representing the probability that the bit is 1 or 0, in other words, the sum may be also seen as a soft bit for that bit. Hence, in an embodiment, the final results at the Z consecutive locations may be regarded as soft bits of the Z bits respectively to restore the Z bits accordingly. In another embodiment, the final results at the Z consecutive locations are normalized by dividing each of those final results by ceil(E/Z) to be soft bits of the Z bits respectively to restore the Z bits accordingly, wherein ceil(X) is function which maps the real number X to the least integer greater than or equal to X, as described above.

In a further embodiment, 1/ceil(E/Z) is quantized by approximating 1/ceil(E/Z) to the sum of negative powers of 2. The quantization may speed up processing of the normalization while keeping enough precision for the normalization. An example of the quantization of 1/ceil(E/Z) is shown in Table 2.

TABLE 2

| An example of the quantization of 1/ceil(E/Z) | | | |
|---|---|---|---|
| ceil(E/Z) | Exact Value = 1/ceil(E/Z) | Quantized Value | Sum of Negative Powers of Two |
| 1 | 1.0000 | 1.0000 | 1 |
| 2 | 0.5000 | 0.5000 | ½ |
| 3 | 0.3333 | 0.3125 | ¼ + ¹⁄₁₆ |
| 4 | 0.2500 | 0.2500 | ¼ |
| 5 | 0.2000 | 0.1875 | ⅛ + ¹⁄₁₆ |
| 6 | 0.1667 | 0.1563 | ⅛ + ¹⁄₃₂ |
| 7 | 0.1429 | 0.1406 | ⅛ + ¹⁄₆₄ |

As compared with the step-by-step operations for the de-rate matching in the prior art, the method according to the present application requires much less memory and processing latency. For example, in the above example of the pipeline processing, the memory amount and processing latency required by the pipeline processing respectively are 2×P×Q×L bytes and T1 (described above in Table 1) for writing the E soft bits (into Buffer A and Buffer B); and the memory amount and processing latency required by the processing of the direct additions for the E soft bits respectively are Z×L bytes and T4 (described above in Table 1), hence the total memory amount required by the method according to the present disclosure are (2×P×Q+Z)×L bytes, and the total processing latency required by the method according to the present disclosure is less than T1+T4, because the pipeline processing may partly overlap with the processing of the direct additions.

Figure 13:
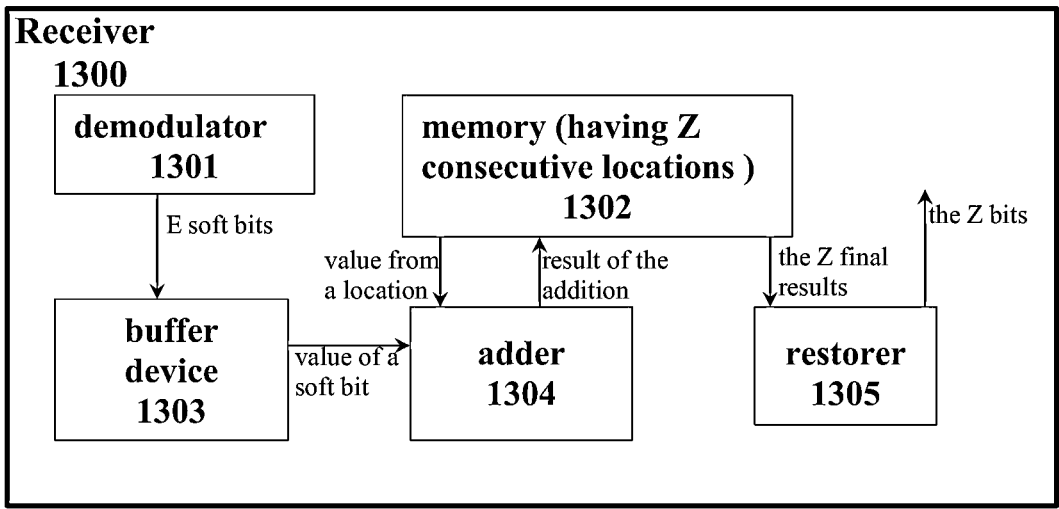
FIG. 13 illustrates a schematic block diagram of a receiver according to the present disclosure.

FIG. 13 illustrates a schematic block diagram of a receiver 1300 according to the present disclosure. The receiver 1300 may include: a demodulator 1301, for demodulating the symbols to obtain E soft bits corresponding to the E bits; a memory 1302, having Z consecutive locations corresponding to bit positions of the Z bits, wherein values at the Z consecutive locations are zeroed before the following additions; a buffer device 1303, for writing the E soft bits; an adder 1304, for each soft bit of the E soft bits in the buffer device, for directly adding value of the soft bit and value from a location of the Z consecutive locations and storing result of the addition back into the location, wherein a bit in the E bits corresponding to the soft bit is a bit in the Z bits corresponding to the location or a copy of the bit in the Z bits; and a restorer 1305, for restoring the Z bits from the final results at the Z consecutive locations. The receiver according to the present disclosure may perform all the operations described above for the method according to the present disclosure, which will not be described repeatedly here.

It can be appreciated that, the receiver 1300 described herein may be implemented by various components, so that the receiver 1300 implementing one or more functions described with the embodiments may comprise not only the components shown in FIG. 13, but also other components for implementing one or more functions thereof. In addition, the receiver 1300 may comprise a single component configured to perform two or more functions, or separate components for each separate function. Moreover, the components may be implemented in hardware, firmware, software, or any combination thereof. For example, it is totally understandable for persons skilled in the art that, the adder 1304 may be implemented by using a Field Programmable Gate Array (FPGA), a Complex Programmable Logic Device (CPLD), a Digital Signal Processor (DSP) or any other device/circuit suitable for realizing the function of the adder 1304, and likewise, the restorer 1305 may be implemented by using a FPGA, a CPLD, a DSP or any other device/circuit suitable for realizing the function of the restorer 1305.

It is understood that blocks of the block diagrams and/or flowchart illustrations, and combinations of blocks in the block diagrams and/or flowchart illustrations, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

It is also to be understood that the functions/acts noted in the blocks of the flowchart may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Furthermore, the solution of the present disclosure may take the form of a computer program on a memory having computer-usable or computer-readable program code embodied in the medium for use by or in connection with an instruction execution system. In the context of this document, a memory may be any medium that may contain, store, or is adapted to communicate the program for use by or in connection with the instruction execution system, apparatus, or device.

Figure 14:
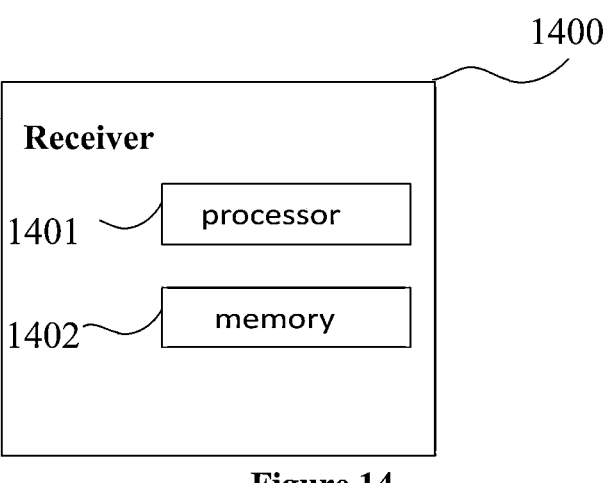
FIG. 14 illustrates another schematic block diagram of a receiver according to the present disclosure.

Therefore, the present disclosure also provides a receiver 1400 including a processor 1401 and a memory 1402, as shown in FIG. 14. In the receiver 1400, the memory 1402 stores instructions that when executed by the processor 1401 cause the receiver 1400 to perform the method of the receiver described above with the embodiments.

The present disclosure also provides a machine readable medium (not illustrated) having stored thereon instructions that when executed on a receiver cause the receiver to perform the method of the receiver described with the above embodiments.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method used by a receiver for facilitating de-rate matching of bits of symbols formed after a rate matching procedure from a transmitter, wherein the transmitter selected Z bits from channel-coded bits, and then generated E bits by concatenation of the Z bits and their copies for the rate matching procedure, and every Q bits formed a symbol, the method comprising:

demodulating the symbols to obtain E soft bits corresponding to the E bits;

zeroing values at Z consecutive locations of a memory, wherein the Z consecutive locations correspond to bit positions of the Z bits;

writing the E soft bits into a buffer device;

for each soft bit of the E soft bits in the buffer device, directly adding value of the soft bit and value from a corresponding location of the Z consecutive locations and storing result of the addition back into the location, wherein a bit in the E bits corresponding to the soft bit is a bit in the Z bits corresponding to the location or a copy of the bit in the Z bits; and restoring the Z bits from the final results at the Z consecutive locations-, wherein assuming i represents the index of a soft bit in the sequence of the E soft bits, and K represents the offset used when selecting the Z bits in the rate matching procedure, the index of the location relating to the addition for the soft bit in the Z consecutive locations is $f-floor(f/Z)\times Z$, where $f=K+0$ $(i-floor(i/Q)\times Q)\times(E/Q)+floor$ $(i/Q)$, wherein floor(X) is a function which maps the real number X to the greatest integer less than or equal to X.

2. The method of claim 1, wherein the E soft bits is divided into multiple portions, the buffer device includes two buffers, and the method performs a pipeline processing for the writing and the additions by the following operations:

alternately writing a different portion of the multiple portions into one of the two buffers in a writing order, and if the portion is not the first portion of the multiple portions, then simultaneously reading soft bits of a previous portion before the portion from the other buffer of the two buffers in a reading order to perform the additions for the soft bits of the previous portion;

reading soft bits of the last portion of the multiple portions in the reading order from a buffer in the two buffers which stores the last potion to perform the additions for the soft bits of the last portion.

3. The method of claim 2, wherein each of the multiple portions consists of $P\times Q$ soft bits which is regarded as a Q-row P-column matrix, the writing order is column-by-column order, and the reading order is row-by-row order.

4. The method of claim 3, wherein width of the memory is an integral multiple of $P\times L$ bytes, wherin L is the number of bytes occupied by each of the E soft bits.

5. The method of claim 4, wherein the memory is implemented by using two block RAMs and one register, wherein one RAM acts as a storage area composed of all even rows of the memory, the other RAM acts as a storage area composed of all odd rows of the memory, and the register acts as a storage area composed of the first row of the memory.

6. The method of claim 1, wherein restoring the Z bits from the final results at the Z consecutive locations comprises:

regarding the final results at the Z consecutive locations as soft bits of the Z bits respectively to restore the Z bits accordingly; or normalizing the final results at the Z consecutive locations by dividing each of those final results by ceil(E/Z) to be soft bits of the Z bits respectively to restore the Z bits accordingly, wherein ceil(X) is function which maps the real number X to the least integer greater than or equal to X.

7. The method of claim 6, wherein 1/ceil(E/Z) is quantized by approximating 1/ceil(E/Z) to the sum of negative powers of 2.

8. A receiver for facilitating de-rate matching of bits of symbols formed after a rate matching procedure from a transmitter, wherein the transmitter selected Z bits from channel-coded bits, and then generated E bits by concatenation of the Z bits and their copies for the rate matching procedure, and every Q bits formed a symbol, the receiver comprising:

a demodulator, for demodulating the symbols to obtain E soft bits corresponding to the E bits;

a memory, having Z consecutive locations corresponding to bit positions of the Z bits, wherein values at the Z consecutive locations are zeroed before the following additions;

a buffer device, for writing the E soft bits;

an adder, for each soft bit of the E soft bits in the buffer device, for directly adding value of the soft bit and value from a corresponding location of the Z consecutive locations and storing result of the addition back into the location, wherein a bit in the E bits corresponding to the soft bit is a bit in the Z bits corresponding to the location or a copy of the bit in the Z bits; and a restorer, for restoring the Z bits from the final results at the Z consecutive locations, wherein assuming i represents the index of a soft bit in the sequence of the E soft bits, and K represents the offset used when selecting the Z bits in the rate matching procedure, the index of the location relating to the addition for the soft bit in the Z consecutive locations is $f-floor(f/Z) \times Z$, where $f=K+(i-floor(i/Q) \times Q) \times (E/Q)+$ floor (i/Q), wherein floor(X) is a function which maps the real number X to the greatest integer less than or equal to X.

9. The receiver of claim 8, wherein the E soft bits is divided into multiple portions, the buffer device includes two buffers, and the receiver performs a pipeline processing for the writing and the additions by the following operations:

alternately writing a different portion of the multiple portions into one of the two buffers in a writing order, and if the portion is not the first portion of the multiple portions, then simultaneously reading soft bits of a previous portion before the portion from the other buffer of the two buffers in a reading order to perform the additions for the soft bits of the previous portion;

reading soft bits of the last portion of the multiple portions in the reading order from a buffer in the two buffers which stores the last potion to perform the additions for the soft bits of the last portion.

10. The receiver of claim 9, wherein each of the multiple portions consists of P×Q soft bits which is regarded as a Q-row P-column matrix, the writing order is column-by-column order, and the reading order is row-by-row order.

11. The receiver of claim 10, wherein width of the memory is an integral multiple of P×L bytes, wherein L is the number of bytes occupied by each of the E soft bits.

12. The receiver of claim 11, wherein the memory is implemented by using two block RAMs and one register, wherein one RAM acts as a storage area composed of all even rows of the memory, the other RAM acts as a storage area composed of all odd rows of the memory, and the register acts as a storage area composed of the first row of the memory.

13. The receiver of claim 8, wherein restoring the Z bits from the final results at the Z consecutive locations comprises:

regarding the final results at the Z consecutive locations as soft bits of the Z bits respectively to restore the Z bits accordingly; or normalizing the final results at the Z consecutive locations by dividing each of those final results by ceil(E/Z) to be soft bits of the Z bits respectively to restore the Z bits accordingly, wherein ceil(X) is function which maps a real number X to the least integer greater than or equal to X.

14. The receiver of claim 13, wherein 1/ceil(E/Z) is quantized by approximating 1/ceil(E/Z) to the sum of negative powers of 2.

* * * * *